United States Patent
Dong

(10) Patent No.: US 11,027,416 B2
(45) Date of Patent: Jun. 8, 2021

(54) TWO-WHEELED SELF-BALANCING ROBOT

(71) Applicant: GoerTek Technology Co., Ltd., Qingdao (CN)

(72) Inventor: Xuehui Dong, Qingdao (CN)

(73) Assignee: GOERTEK TECHNOLOGY CO., LTD., Qingdao (CN)

( * ) Notice: Subject to any disclaimer, the term of this patent is extended or adjusted under 35 U.S.C. 154(b) by 0 days.

(21) Appl. No.: 16/622,209

(22) PCT Filed: Nov. 14, 2017

(86) PCT No.: PCT/CN2017/110903
§ 371 (c)(1),
(2) Date: Dec. 12, 2019

(87) PCT Pub. No.: WO2019/024317
PCT Pub. Date: Feb. 7, 2019

(65) Prior Publication Data
US 2020/0180141 A1    Jun. 11, 2020

(30) Foreign Application Priority Data
Aug. 4, 2017   (CN) .......................... 201710662076.4

(51) Int. Cl.
*B25J 5/00*     (2006.01)
*B25J 19/00*    (2006.01)
(Continued)

(52) U.S. Cl.
CPC .............. *B25J 5/007* (2013.01); *B25J 9/0009* (2013.01); *B25J 19/0008* (2013.01); *B25J 19/02* (2013.01)

(58) Field of Classification Search
CPC . B25J 5/007; B25J 19/02; B25J 9/0009; B25J 19/0008
See application file for complete search history.

(56) References Cited

U.S. PATENT DOCUMENTS

2007/0169977 A1   7/2007 Ellis et al.
2013/0228385 A1*  9/2013 Chen .................... B62K 11/007
                                                     180/6.5

FOREIGN PATENT DOCUMENTS

CN    1952996 A    4/2007
CN    102923204 A   2/2013
(Continued)

OTHER PUBLICATIONS

International Search Report issued in PCT/CN2017/110903 dated Apr. 27, 2018.
(Continued)

*Primary Examiner* — Kawing Chan
*Assistant Examiner* — Bradley R Brown
(74) *Attorney, Agent, or Firm* — Fox Rothschild LLP; Carol E. Thorstad-Forsyth

(57) ABSTRACT

The present disclosure discloses a two-wheeled self-balancing robot which solves the technical problems in the prior art that the robot can only travel on a flat ground and its driving environments are limited by making improvements in its mechanical structure. The two-wheeled self-balancing robot comprises a vehicle body with wheels mounted on both sides thereof. The vehicle body comprises a parallelogram frame which can deform tiltedly. The vehicle body is provided with a stage, and the stage is hinged with the parallelogram frame. The parallelogram frame is provided with a first motor. The first motor drives the parallelogram frame to deform tiltedly according to road conditions so as to always keep the stage horizontal. The two-wheeled self-balancing robot according to the present disclosure can adapt to complicated road conditions, and its stage always keeps horizontal such that the object carried is not prone to fall off.

8 Claims, 3 Drawing Sheets

(51) Int. Cl.
  *B25J 9/00* (2006.01)
  *B25J 19/02* (2006.01)

(56) References Cited

FOREIGN PATENT DOCUMENTS

| | | |
|---|---|---|
| CN | 203191852 U | 9/2013 |
| CN | 103600799 A | 2/2014 |
| CN | 203698533 U | 7/2014 |
| CN | 104608859 A | 5/2015 |
| CN | 104648497 A | 5/2015 |
| CN | 105068541 A | 11/2015 |
| CN | 106800049 A | 6/2017 |
| CN | 106828724 A | 6/2017 |
| CN | 207510524 U | 6/2018 |
| DE | 102013223985 A1 | 5/2015 |

OTHER PUBLICATIONS

First Office Action issued in Chinese Patent Application No. 201710662076.4 filed Aug. 4, 2017.

\* cited by examiner

TWO-WHEELED SELF-BALANCING ROBOT

CROSS-REFERENCE TO RELATED APPLICATIONS

This application is a U.S. National Stage entry under 35 U.S.C. § 371 based on International Application No. PCT/CN2017/110903, filed on Nov. 14, 2017, which claims priority to Chinese Patent Application No. 201710662076.4, filed on Aug. 4, 2017. The embodiment of the priority applications are hereby incorporated herein in their entirety by reference.

TECHNICAL FIELD

The present disclosure relates to a robot, and in particular to a two-wheeled self-balancing robot.

BACKGROUND

The structure of the two-wheeled robot is characterized in that its two wheels are coaxial and independently driven, the center of gravity of the vehicle body is above the wheel shaft, and it maintains the balance of vehicle body through the movement of wheel. The robot has a turning radius of zero, can operate in a narrow space, has not a brake system, and is easy to control.

In the prior art, the improvements in two-wheeled robots mainly focus on the control algorithm. The current two-wheeled robot has the following defects: the robot needs human assistance to maintain the initial dynamic balance, and the operation is complicated; when the robot travels on a slope, the object carried by the robot forms an angle of inclination with respect to the ground and is prone to fall off; the robot can only travel on a flat ground, and its driving environments are limited.

SUMMARY

In view of the above problems in the prior art, the present disclosure provides a two-wheeled self-balancing robot which can adapt to complicated road conditions, and the object carried is not prone to fall off.

In order to achieve the above object, the present disclosure adopts the following technical solutions:

The present disclosure provides a two-wheeled self-balancing robot, comprising a vehicle body with wheels mounted on both sides thereof, wherein the vehicle body comprises a parallelogram frame for enabling the vehicle body to deform tiltedly; the vehicle body is provided with a stage, the stage is hinged with the parallelogram frame; the parallelogram frame is provided with a first motor, and the first motor drives the parallelogram frame to deform tiltedly according to road conditions so as to always keep the stage horizontal. By having the above technical features, the two-wheeled self-balancing robot can adapt to different road conditions, thereby improving the adaptability of the two-wheeled self-balancing robot; moreover, the object carried by the robot is not prone to fall off, thereby improving the carrying capability of the two-wheeled self-balancing robot.

Preferably, an angle sensor or a gyroscope is provided on the stage to detect an angle of the stage relative to a horizontal plane, and when the robot is on an uneven road, the first motor drives the parallelogram frame to deform tiltedly according to angle values detected by the angle sensor or the gyroscope so as to always keep the stage horizontal. By having the above technical features, the two-wheeled self-balancing robot can be intelligently adjusted, and the parallelogram frame can automatically and moderately deformed tiltedly to adapt to different road conditions.

Preferably, the parallelogram frame comprises an upper plate and a middle plate arranged in parallel, and a left side plate and a right side plates on both sides; the upper plate and the middle plate are hinged with the left side plate and the right side plate respectively; and a left wheel is mounted on a lower end of the left side plate, and a right wheel is mounted on a lower end of the right side plate. By having the above technical features, a vehicle body that can flexibly deform tiltedly to the left and right is constructed for the two-wheeled self-balancing robot.

Preferably, a flywheel is provided in the parallelogram frame, the flywheel is located in a central perpendicular plane which is perpendicular to a connection line of centers of two wheels at a center of the connection line, and the rotation of the flywheel keeps the vehicle body in a standing state due to the gyroscopic effect. By having the above technical features, the two-wheeled self-balancing robot can automatically stand up and keep standing without external aid, thereby eliminating the operation that the robot needs to be straightened manually when the self-balancing robot starts to operate, eliminating the operation of human assistance.

Preferably, a lower portion of the middle plate is provided with a flywheel support plate which is parallel to the middle plate; two sides of the flywheel support plate are respectively hinged to the side plates; the flywheel support plate is provided with a flywheel seat at a middle position of the flywheel support plate, the flywheel is mounted in the flywheel seat, and a second motor is mounted below or above the flywheel seat to drive the flywheel to rotate. By having the above technical features, the two-wheeled self-balancing robot is provided with a flywheel that can rotate tiltedly following the tilted deformation of the vehicle body, thereby improving the traveling stability of the two-wheeled self-balancing robot.

Preferably, the flywheel is provided with a central shaft, a rotating shaft of the second motor is coupled to the central shaft of the flywheel, and the flywheel seat is provided with upper and lower bearings to support and fix the central shaft of the flywheel. By having the above technical features, the friction during the rotation of the flywheel can be minimized.

Preferably, the stage is T-shaped and comprises a horizontal support platform and a leg perpendicular to the support platform, a middle portion of the leg is hinged to the upper plate, and a lower end of the leg is hinged to the middle plate. By having the above technical features, the two-wheeled self-balancing robot is provided with a stage that can adapt to the deformation of the vehicle body. When the vehicle body deforms tiltedly to the left and right, the leg of the stage can always keep vertical, and the support platform of the stage can always keep horizontal, thereby improving the carrying capacity of the two-wheeled self-balancing robot.

Preferably, the first motor is mounted on the middle plate, a rotating shaft of the first motor is coupled to a hinged shaft of the middle plate and the leg, the hinged shaft and the leg are fixedly connected, and the leg of the stage always keeps a vertical state. By having the above technical features, the middle panel and the stage can be made to be intrinsically linked. The stator and the rotor of the first motor are respectively fixedly connected with the middle panel and the stage, since the force acts on each other, the driving force is simultaneously applied to the middle plate and the stage, and there occurs a relative tilt between the two.

Preferably, a middle portion of the upper plate is provided with a through hole, the leg of the stage passes through the through hole, and the leg of the stage and the upper plate are hinged at the through hole. By having the above technical features, the connection structure between the stage and the vehicle body will be stronger.

Preferably, hinges or hinged shafts are provided at positions where the upper plate, the middle plate and the side plates are hinged and where the flywheel support plate and the side plate are hinged, such that the upper plate, the middle plate, and the flywheel support plate are rotatable relative to the side plates. By providing hinges, the connection strength between the rotating parts can be improved; by providing hinged shafts the connection structure between the rotating parts can be simplified.

Preferably, the left wheel is provided with a third motor, the right wheel is provided with a fourth motor, and the third motor and the fourth motor are both mounted on the inner side of the side plates. By having the above technical features, the space in the vehicle body can be reasonably utilized, and the volume of the vehicle body of the two-wheeled self-balancing robot can be minimized. The third motor and the fourth motor are used to maintain the dynamic balance of the two-wheeled self-balancing robot.

Preferably, the vehicle body is provided with a battery which supplies power to the first motor, the second motor, the third motor and the fourth motor, and the battery may be a lithium battery. By having the above technical features, a basic power source is provided for the driving of the two-wheeled self-balancing robot.

The two-wheeled self-balancing robots with the above configurations have the following advantages:

The vehicle body of the present disclosure adopts a parallelogram mechanism. When the robot is traveling on a slope or an uneven road, the driving motor drives the parallelogram mechanism to tilt, and at this point, the stage is always horizontal, and the object carried is not prone to fall off.

The vehicle body of the present disclosure is provided with a flywheel mechanism. The robot can stand up automatically by taking advantage of the gyroscopic effect of the flywheel, and keep standing without external aid, thereby eliminating the operation of human assistance when the self-balancing robot starts to operate; then the robot achieves dynamic balance movement through two-wheel drive.

The structure of the robot of the present disclosure is symmetrical and reasonable in design. The center of gravity is on the perpendicular surface of the axis of the driving wheels of the robot, which reduces the influence of an offset of the center of gravity on the movement of the robot.

Figure 1:
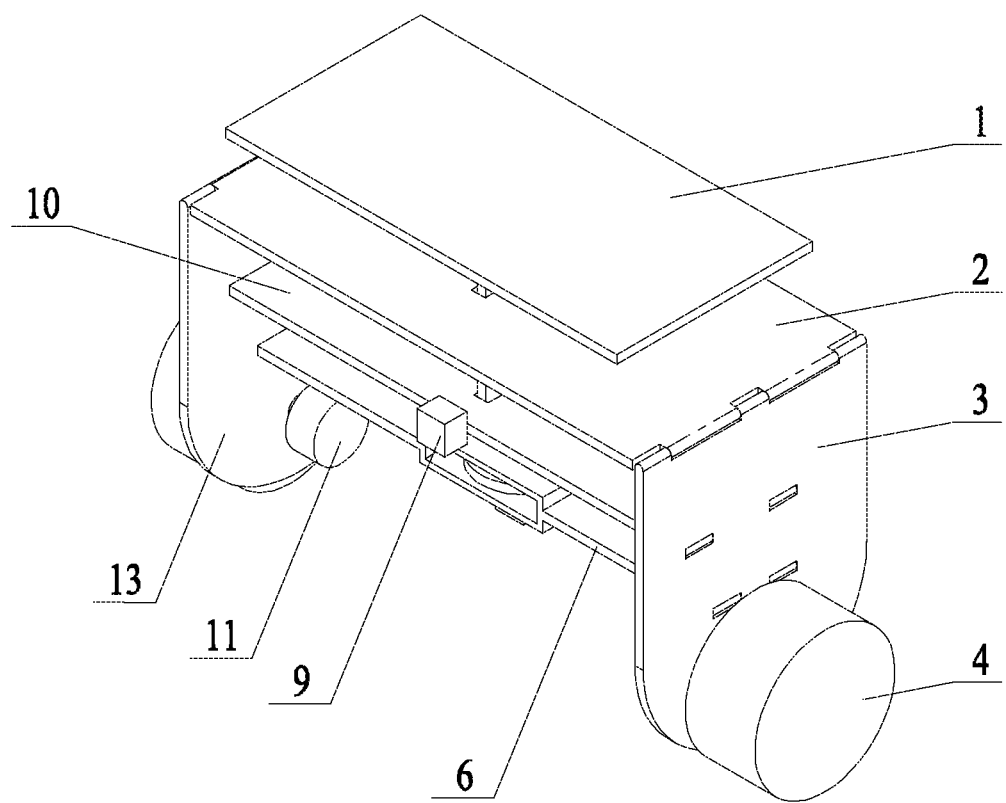
FIG. 1 is a perspective view of a two-wheeled self-balancing robot of the present disclosure.

In the drawings:
1: stage; 1-1: support platform; 1-2: leg; 2: upper plate; 3: right side plate; 4: right wheel; 5: fourth motor; 6: flywheel support plate; 7: second motor; 8: flywheel; 9: first motor; 10: middle plate; 11: third motor; 12: left wheel; 13: left side plate.

DETAILED DESCRIPTION

The design concept of the present disclosure is as follows.

In the prior art, the two-wheeled self-balancing robot usually needs human assistance to maintain the initial dynamic balance, and the operation is complicated; when the robot travels on a slope, the object carried by the robot forms an angle of inclination with respect to the ground and is prone to fall off; the robot can only travel on a flat ground, and its driving environments are limited.

Thus, the present disclosure provides a two-wheeled self-balancing robot, which is improved mainly in the mechanical structure. Specifically, the vehicle body is designed to have a parallelogram shape which can deform tiltedly under the driving of the motor according to the road conditions; a stage is mounted on the vehicle body, and the stage can always keep horizontal, so that the two-wheeled self-balancing robot can adapt to complicated road conditions, and the object carried is not prone to fall off.

The vehicle body is equipped with a high-speed rotating flywheel. Due to the gyroscopic effect of the flywheel, the robot can stand up automatically and keep standing without external aid, thereby eliminating the need for human assistance to maintain the initial dynamic balance.

In order to make the objects, technical solutions and advantages of the present disclosure clearer, the embodiments of the present disclosure will be further described in detail with reference to the accompanying drawings.

First Embodiment

Figure 2:
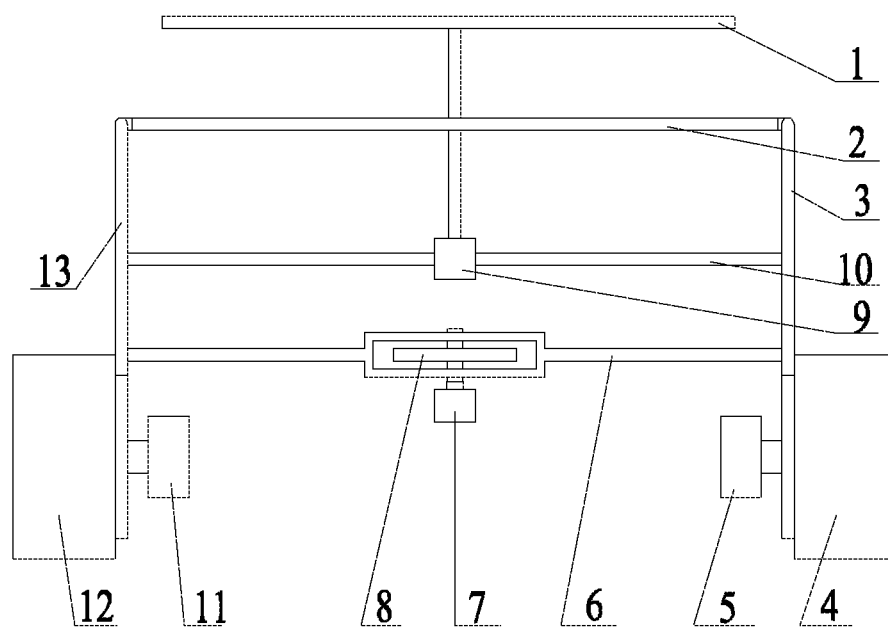
FIG. 2 is a front view of the two-wheeled self-balancing robot of the present disclosure.
Figure 3:
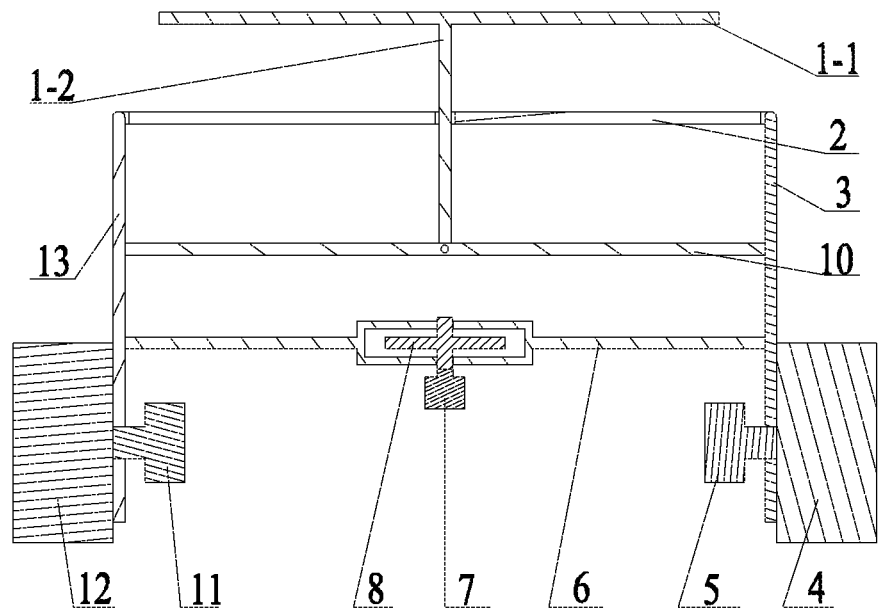
FIG. 3 is a cross-sectional view of the two-wheeled self-balancing robot of the present disclosure.

As shown in FIG. 1, FIG. 2 and FIG. 3, the first embodiment of the present disclosure provides a two-wheeled self-balancing robot. The two-wheeled self-balancing robot comprises a vehicle body, and wheels mounted on both sides of the vehicle body. The vehicle body comprises a parallelogram frame for enabling the vehicle body to deform tiltedly. The vehicle body is provided with a stage 1, the stage 1 is hinged with the parallelogram frame. The parallelogram frame is provided with a first motor 9, and the first motor 9 drives the parallelogram frame to deform tiltedly according to road conditions so as to always keep the stage 1 horizontal.

Figure 5:
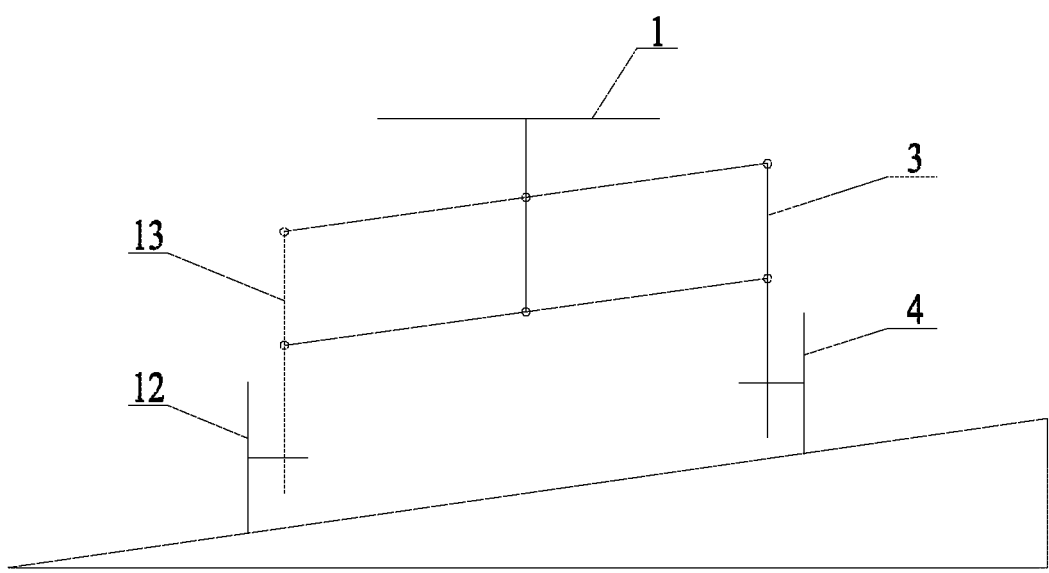
FIG. 5 is a schematic view showing the walking state of the two-wheeled self-balancing robot of the present disclosure.

According to the present embodiment, the parallelogram frame can deform tiltedly to the left or to the right according to the height of the road surface. As shown in FIG. 5, the road is low on the left side and high on the right side, and the right side of the parallelogram frame is raised, so the parallelogram frame will deform tiltedly to the right. If traveling on a road which is high on the left side and low on the right side, the left side of the parallelogram frame is raised, and the parallelogram frame will deform tiltedly to the left. When traveling on an uneven road, the parallelogram frame will continually deform tiltedly to the left or to the right. Similarly, when the robot travels on a rough road or need to climb a slope, the parallelogram frame can be adjusted accordingly so that the stage 1 can always keep horizontal.

The vehicle body shown in FIG. 1, FIG. 2, and FIG. 3 is in a rectangular state, which can be seen as the initial state of the two-wheeled self-balancing robot.

The parallelogram frame comprises an upper plate 2 and a middle plate 10 arranged in parallel, and a left side plate 13 and a right side plate 3 on both sides. The upper plate 2 and the middle plate 10 are hinged to the left side plate 13 and the right side plate 3, respectively. A left wheel 12 is mounted at the lower end of the left side plate 13, and a right wheel 4 is mounted at the lower end of the right side plate 3.

A flywheel 8 is provided in the parallelogram frame. When the parallelogram frame is rectangular, the flywheel 8 is located in a central perpendicular plane which is perpendicular to the connection line of centers of the left wheel 12 and the right wheel 4 at the center of the connection line. If the parallelogram frame is tilted into a parallelogram shape, the above positional relationship between the flywheel 8 and the two wheels will be changed, but the axis of the flywheel 8 will still be perpendicular to the connection line of centers of the left wheel 12 and the right wheel 4, which can be seen from the geometric relationship of the components in FIG. 5. When the parallelogram frame deforms tiltedly to the left or to the right, the positional relationship between the flywheel 8 and the two wheels is also continually changed. As long as the parallelogram frame changes back to a rectangular shape, the flywheel 8 will be located in the central perpendicular plane of the connection line of centers of two wheels. Due to the gyroscopic effect, the rotation of the flywheel 8 causes the vehicle body to stand up automatically and keep a standing state. The vehicle body stands up without external aid.

The lower portion of the middle plate 10 is provided with a flywheel support plate 6 which is parallel to the middle plate. The two sides of the flywheel support plate 6 are respectively hinged to the side plates. The flywheel support plate 6 is provided with a flywheel seat, the flywheel seat is disposed at a middle position of the flywheel support plate 6, and the flywheel 8 is mounted in the flywheel seat. A second motor 7 is mounted below the flywheel seat or above the flywheel seat to drive the flywheel 8 to rotate. The stator (outer casing) of the second motor 7 need to be mounted and fixed on the flywheel seat, and the rotating shaft (rotor) of the second motor 7 is connected to the flywheel shaft.

Figure 4:
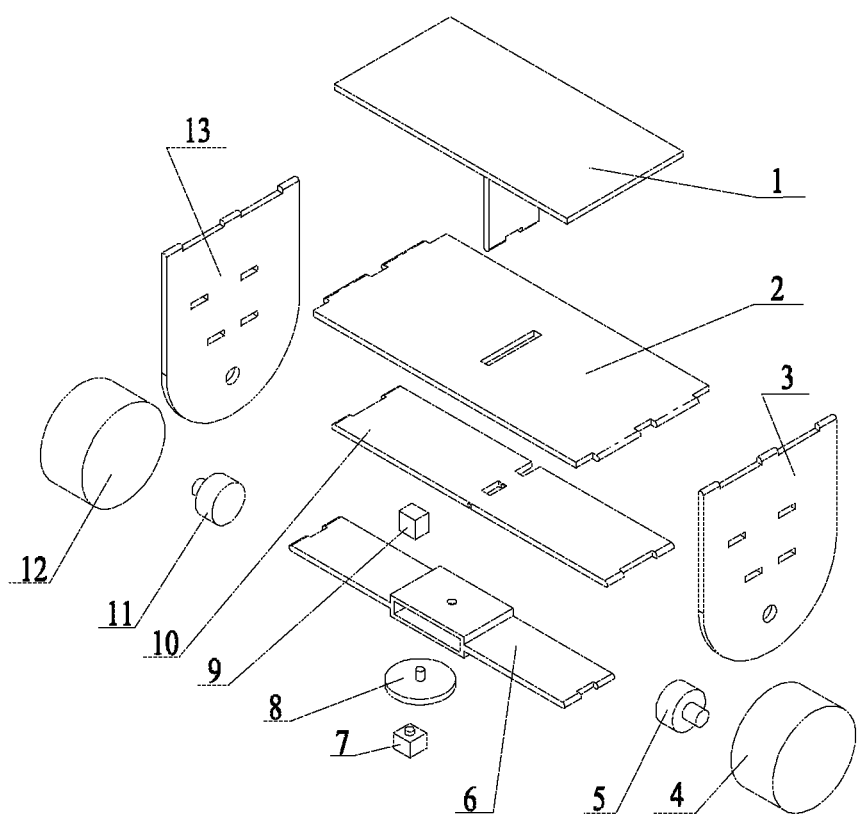
FIG. 4 is an exploded view of the two-wheeled self-balancing robot of the present disclosure.

As shown in FIG. 3 and FIG. 4, the flywheel seat is a rectangular frame, and the flywheel 8 is mounted and rotates in the flywheel seat. The flywheel 8 is provided with a central shaft. The rotating shaft of the second motor 7 is coupled to the central shaft of the flywheel 8. The flywheel seat is provided with upper and lower bearings to support and fix the central shaft of the flywheel 8, so that the friction during the rotation of the flywheel 8 is minimized.

The axis of the flywheel 8 is perpendicular to the flywheel support plate 6. When the flywheel support plate 6 is in a horizontal state, the axis of the flywheel 8 will be in a vertical state. When the flywheel support plate 6 is in a tilted state, the axis of the flywheel 8 will also be tilted.

In the present embodiment, the stage 1 is T-shaped and comprises a horizontal support platform 1-1 and a leg 1-2 perpendicular to the support platform 1-1. A middle portion of the leg 1-2 is hinged to the upper plate 2. A lower end of the leg 1-2 is hinged to the middle plate 10. The stator (outer casing) of the first motor 9 is mounted on the middle plate 10. The rotating shaft (rotor) of the first motor 9 is coupled to a hinge shaft of the middle plate 10 and the leg 1-2. The hinged shaft and the leg 1-2 are fixedly connected.

As two points determine a straight line, the leg 1-2 of the stage 1 are provided with two hinge positions, such that the vertical direction of the leg 1-2 can be determined. In addition, because of the interaction of forces, during the rotation of the first motor 9, the leg 1-2 is in the vertical direction, both the upper plate 2 and the middle plate 10 correspondingly tilt, and the flywheel support plate 6, the left side plate 13 and the right side plates 3 also tilt correspondingly.

The leg 1-2 of the stage 1 and the side plates are always parallel and always in a vertical state.

The principle that the support platform 1-1 of the stage 1 can keep horizontal is as follows. An angle sensor or a gyroscope is provided on the stage 1 to detect an angle of the stage 1 relative to the horizontal plane. When the robot is on an uneven road, the first motor 9 drives the parallelogram frame to deform tiltedly according to angle values detected by the angle sensor or the gyroscope, so that the support platform 1-1 of the stage 1 is kept horizontal. The first motor 9 may be a stepping motor capable of detecting a rotation angle value of its own rotor.

An auxiliary fixture may further be provided on the platform 1-1 to fix the loaded object, but the auxiliary fixture should be designed according to the balancing of the center of gravity of the robot.

A through hole is provided in the middle portion of the upper plate 2, and the leg 1-2 of the stage 1 passes through the through hole. The leg 1-2 of the stage 1 and the upper plate 2 are hinged at the through hole. The width of the through hole must be greater than the thickness of the leg 1-2 of the stage 1, so that a gap is left, and the upper plate 2 and the leg 1-2 can rotate relative to each other.

Hinges are provided at positions where the upper plate 2, the middle plate 10 and the side plates are hinged and where the flywheel support plate 6 and the side plates are hinged. Two leafs of the hinge are respectively fixed on the upper plate 2 and the side plate, or on the middle plate 10 and the side plate, or on the flywheel support plate 6 and the side plate. By providing hinges, the connection strength between the rotating parts can be improved.

Alternatively, only a hinged shaft is provided at the hinged position, and correspondingly, a through hole is provided in the side plate. The two ends of the upper plate 2, two ends of the middle plate 10, and two ends of the flywheel support plate 6 are respectively inserted into these through holes, and an articulated relationship is formed by the hinged shaft. By providing hinged shafts, the connection structure between the rotating parts can be simplified.

As shown in FIG. 2, the left wheel 12 is provided with a third motor 11, and the right wheel 4 is provided with a fourth motor 5. The third motor 11 and the fourth motor 5 are both mounted on the inner side of the side plates. The stators (outer casings) of the third motor 11 and the fourth motor 5 need to be mounted and fixed on the side plates, and the rotating shafts (rotors) of the third motor 11 and the fourth motor 5 are coupled to the wheel shafts.

In the present embodiment, the vehicle body should have a battery, and the battery can be a lithium battery. The battery supplies power to the first motor 9, the second motor 7, the third motor 11 and the fourth motor 5. The battery may be mounted on the upper plate 2, the middle plate 10 or the flywheel support plate 6. Similarly, the battery and the position where it is mounted should be designed according to the balancing of the center of gravity of the robot.

When the two-wheeled self-balancing robot is not working but is placed on the ground, if the vehicle body falls on the ground and is in a natural tilted state, the flywheel 8 is started to rotate, and the vehicle body automatically stands up and keeps the standing state due to the gyroscopic effect. The vehicle body maintains a rectangular state when it is in the standing state. When the third motor 11 and the fourth motor 5 respectively drive the wheels on both sides, the two-wheeled self-balancing robot can maintain dynamic balance.

The walking state of the two-wheeled self-balancing robot is shown in FIG. 5. When walking on a slope, only the vehicle body deforms tiltedly, and the shape of the vehicle body is adjusted from rectangular to tilted parallelogram, but the stage 1 always keeps horizontal.

When the two-wheeled self-balancing robot walks to a horizontal road surface, the vehicle body changes back to a rectangular state.

Second Embodiment

The present embodiment is different from the first embodiment in that, the upper plate 2, the middle plate 10, the left side plate 13, the right side plate 3 and the flywheel support plate 6 are all hollow or cutout plates or of a rod structure, which is beneficial to reducing the weight of the robot.

Other structures of the two-wheeled self-balancing robot in the second embodiment are the same as that of the first embodiment, and will not be repeated herein.

The above description is merely specific embodiments of the present disclosure. Based on the above teachings of the present disclosure, those skilled in the art may make other improvements or modifications on the basis of the foregoing embodiments. It should be understood by those skilled in the art that the above specific description is only for better explaining the present disclosure, and the scope of the present disclosure should be defined by the protection scope of the claims.

What is claimed is:

1. A two-wheeled self-balancing robot, comprising a vehicle body with wheels mounted on both sides thereof, wherein:
   the vehicle body comprises a parallelogram frame for enabling the vehicle body to deform tiltedly;
   the vehicle body is provided with a stage, and the stage is hinged with the parallelogram frame;
   the parallelogram frame is provided with a first motor, and the first motor drives the parallelogram frame to deform tiltedly according to road conditions so as to always keep the stage horizontal;
   a flywheel is provided in the parallelogram frame, the flywheel is located in a central perpendicular plane which is perpendicular to a connection line of centers of two wheels at a center of the connection line, and rotation of the flywheel keeps the vehicle body in a standing state due to gyroscopic effect; and
   a lower portion of the middle plate is provided with a flywheel support plate which is parallel to the middle plate; two sides of the flywheel support plate are respectively hinged to the side plates; the flywheel support plate is provided with a flywheel seat at a middle position of the flywheel support plate, the flywheel is mounted in the flywheel seat, and a second motor is mounted below or above the flywheel seat to drive the flywheel to rotate.

2. The two-wheeled self-balancing robot according to claim 1, wherein an angle sensor or a gyroscope is provided on the stage to detect an angle of the stage relative to a horizontal plane, and when the robot is on an uneven road, the first motor drives the parallelogram frame to deform tiltedly according to angle values detected by the angle sensor or the gyroscope so as to always keep the stage horizontal.

3. A two-wheeled self-balancing robot according to claim 1, wherein the parallelogram frame comprises an upper plate and a middle plate arranged in parallel, and a left side plate and a right side plates on both sides;
   the upper plate and the middle plate are hinged with the left side plate and the right side plate respectively; and
   a left wheel is mounted at a lower end of the left side plate, and a right wheel is mounted at a lower end of the right side plate.

4. The two-wheeled self-balancing robot according to claim 1, wherein the flywheel is provided with a central shaft, a rotating shaft of the second motor is coupled to the central shaft of the flywheel, and the flywheel seat is provided with upper and lower bearings to support and fix the central shaft of the flywheel.

5. A two-wheeled self-balancing robot according to claim 3, wherein the stage is T-shaped and comprises a horizontal support platform and a leg perpendicular to the support platform, a middle portion of the leg is hinged to the upper plate, and a lower end of the leg is hinged to the middle plate.

6. A two-wheeled self-balancing robot according to claim 5, wherein the first motor is mounted on the middle plate, a rotating shaft of the first motor is coupled to a hinged shaft of the middle plate and the leg, the hinged shaft and the leg are fixedly connected, and the leg of the stage always keeps a vertical state.

7. The two-wheeled self-balancing robot according to claim 5, wherein a middle portion of the upper plate is provided with a through hole, the leg of the stage passes through the through hole, and the leg of the stage and the upper plate are hinged at the through hole.

8. The two-wheeled self-balancing robot according to claim 1, wherein hinges or hinged shafts are provided at positions where the upper plate, the middle plate and the side plates are hinged and where the flywheel support plate and the side plate are hinged, such that the upper plate, the middle plate and the flywheel support plate are rotatable relative to the side plates.

* * * * *